March 29, 1966  J. B. HERON, JR., ET AL  3,243,671
CERAMIC CAPACITOR
Filed Jan. 22, 1965
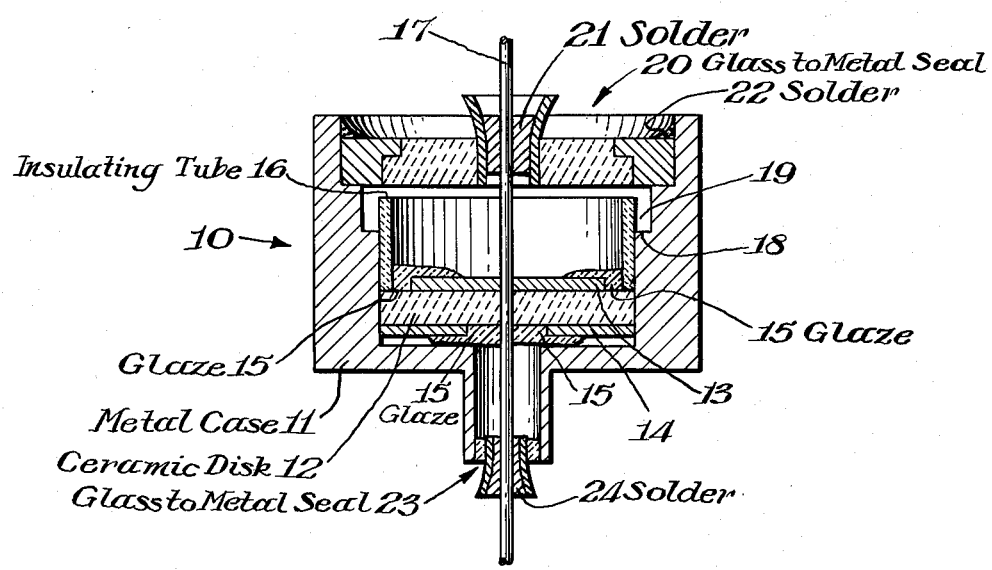
INVENTORS
John B. Heron, Jr.
John H. Fabricius
BY Connolly and Hutz
ATTORNEYS 3,243,671
CERAMIC CAPACITOR
John B. Heron, Jr., Nashua, N.H., and John H. Fabricius, Stamford, Vt., assignors to Sprague Electric Company, North Adams, Mass., a corporation of Massachusetts
Filed Jan. 22, 1965, Ser. No. 427,339
3 Claims. (Cl. 317—242)

The present invention is concerned with ceramic capacitors and more particularly with ceramic feed-thru capacitors.

In the manufacture of ceramic capacitors there always exists the possibility of inadvertently forming low resistance paths between the electrodes.

It is an object of the present invention to overcome this problem.

Other objects and advantages of the present invention will be made obvious to those skilled in the art by the following description when considered in relation to the accompanying drawing of which:

The drawing is a side view in section of a preferred embodiment of this invention.

In general, the capacitor of the present invention comprises a ceramic disc having a central aperture; a feed-thru electrode and a counterelectrode is in capacitive arrangement on opposite sides of said disc; a feed-thru lead, fixed to said feed-thru electrode, extends thru said central aperture; a layer of glaze material extends over part of each electrode, one glaze layer insulates said feed-thru lead from said counterelectrode, the other layer insulates the feed-thru electrode from the counterelectrode; positioned on said ceramic disc between the periphery thereof and the periphery of the feed-thru electrode is an insulating tube. The capacitor and surmounting insulating tube are hermetically sealed within a metal case. The feed-thru lead, extends out each end of the hermetically sealed case. In said case, adjacent to said tube is a radially-directed wall, said wall in conjunction with the wall of said tube and the longitudinally extending wall of the case defines a contaminant trap about said insulating tube.

Referring to the drawing, the ceramic capacitor 10 comprises metal case 11 housing ceramic disc 12. Fired on said disc are feed-thru electrode 13 and counterelectrode 14. A layer of glaze material 15 extends over part of each electrode. One glaze layer insulates the feed-thru lead 17 from counterelectrode 14. The other glaze layer insulates the feed-thru electrode 13 from counterelectrode 14 and metal case 11. Positioned on said ceramic disc 12 between the periphery thereof and the periphery of the feed-thru electrode 13 is an insulating tube 16. Between the wall of metal case 11 and the upper part of insulating tube 16 is a short radially-directed wall 18 which defines a contaminant-trap 19. About feed-thru lead 17 and generally designated 20 is a glass-to-metal seal. The seal is composed of a mass of glass surrounding and fused to a tubular metal eyelet and surrounded by and fused to a metal washer. The seal is soldered to the lead 17 at 21 and to the case 11 at 22. A similar glass-to-metal seal 23 closes the other end of the unit. The seal is soldered to the lead at 24.

The insulating tube which surmounts the ceramic capacitor, increases the distance of low dielectric strength between the electrodes. Thus, the tube acts as a division between electrodes of opposite polarity and keeps foreign material from forming a low resistivity path between the electrodes or between the feed-thru electrode and the metal case. Furthermore, the insulating tube, the radially-directed wall, and the longitudinally extending wall defines a contaminant trap about said insulating tube. This trap is intended to catch and isolate any foreign material which may be inside the metal case and not flushed out during a final cleaning process.

The ceramic disc can be any of the prior art ceramic dielectrics, e.g. barium titanate, etc. The electrodes likewise can be any of the prior art electrodes, e.g. silver, the platinum metals, etc.

The insulating tube which surmounts the ceramic capacitor can be of the same material as the ceramic disc or it can be of some other rigid heat stable insulating material. The glaze material which helps to insulate the electrodes from one another and which also bonds the insulating tube to the capacitor can be of any commercially available glaze. By glaze is meant a glass frit that has been fused together by heat. While the dimensions of the insulating tube are not critical, the length of the tube can be equal to about 2 to 10 times the thickness of the dielectric ceramic disc. For certain applications another insulating tube may be positioned about the feed-thru lead between the bottom of the capacitor disc and the glass-to-metal seal.

While the metal casing has been shown to be hermetically sealed by means of glass-to-metal seals, it is to be understood that other sealing means may be used. The metal casing can be steel, nickel, etc.

Since it is obvious that many changes and modifications can be made in the above described details without departing from the nature and spirit of the invention, it is to be understood that the invention is not limited to said details except as set forth in the appended claims.

What is claimed is:

1. A ceramic feed-thru capacitor comprising a ceramic disc having a central aperture; a feed-thru electrode and a counterelectrode in capacitive arrangement on opposite sides of said disc, a feed-thru lead fixed to said feed-thru electrode extending through said central aperture; a layer of glaze material extending over part of each electrode, one glaze layer insulating said feed-thru lead from said counterelectrode, the other layer insulating the feed-thru electrode from the counterelectrode; a heat stable insulating tube positioned on said ceramic disc between the periphery thereof and the periphery of the feed-thru electrode; said capacitor and insulating tube being hermetically sealed within a metal case, the feed-thru lead extending out each end of the hermetically sealed case.

2. A ceramic feed-thru capacitor comprising a ceramic disc having a central aperture; a feed-thru electrode and a counterelectrode in capacitive arrangement on opposite sides of said disc, a feed-thru lead fixed to said feed-thru electrode extending through said central aperture; a layer of glaze material extending over part of each electrode, one glaze layer insulating said feed-thru lead from said counterelectrode, the other layer insulating the feed-thru electrode from the counterelectrode; a heat stable insulating tube positioned on said ceramic disc between the periphery thereof and the periphery of the feed-thru electrode; said capacitor and insulating tube being hermetically sealed within a metal case, the feed-thru lead extending out each end of the hermetically sealed case; a radially directed wall of said case adjacent said tube defining in conjunction with the wall of said tube and the longitudinally extending wall of said case a contaminant trap about said insulating tube.

3. The capacitor of claim 2 hermetically sealed by means of glass-to-metal seals.

References Cited by the Examiner

UNITED STATES PATENTS

| | | | |
|---|---|---|---|
| 2,922,936 | 1/1960 | Dehn et al. | 317—242 |
| 2,983,855 | 5/1961 | Schlicke | 317—242 |
| 3,036,249 | 5/1962 | Hall | 317—242 X |

OTHER REFERENCES

Werner: German application No. 1,041,159, published Oct. 16, 1958.

ROBERT K. SCHAEFER, *Primary Examiner.*

JOHN F. BURNS, *Examiner.*

D. J. BADER, *Assistant Examiner.*